A. ROSS.
SAW FILING MACHINE.
APPLICATION FILED JAN. 13, 1912.
1,059,909.
Patented Apr. 22, 1913.
3 SHEETS—SHEET 1.
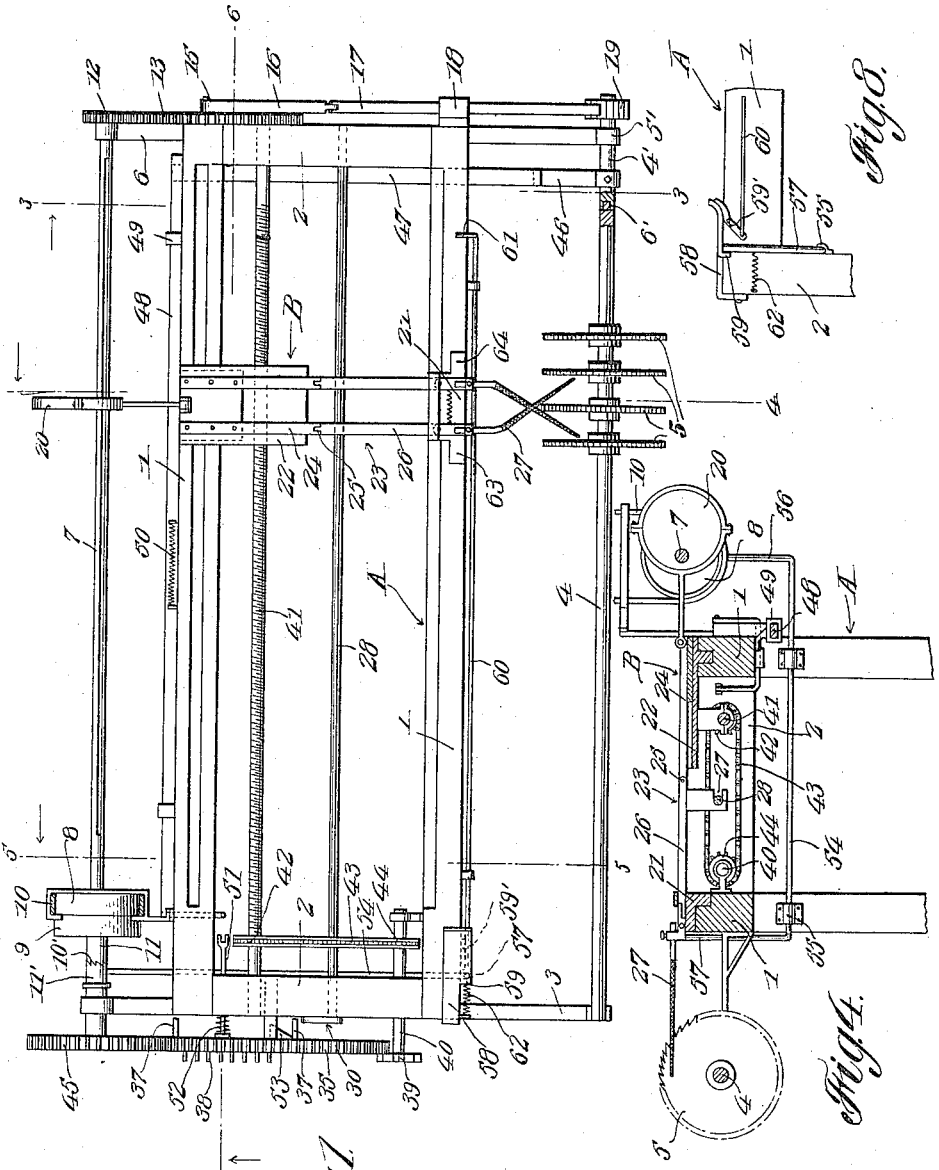
Witnesses
J. H. Crawford.
John J. McCarthy
Inventor
Albert Ross,
By Victor J. Evans
Attorney

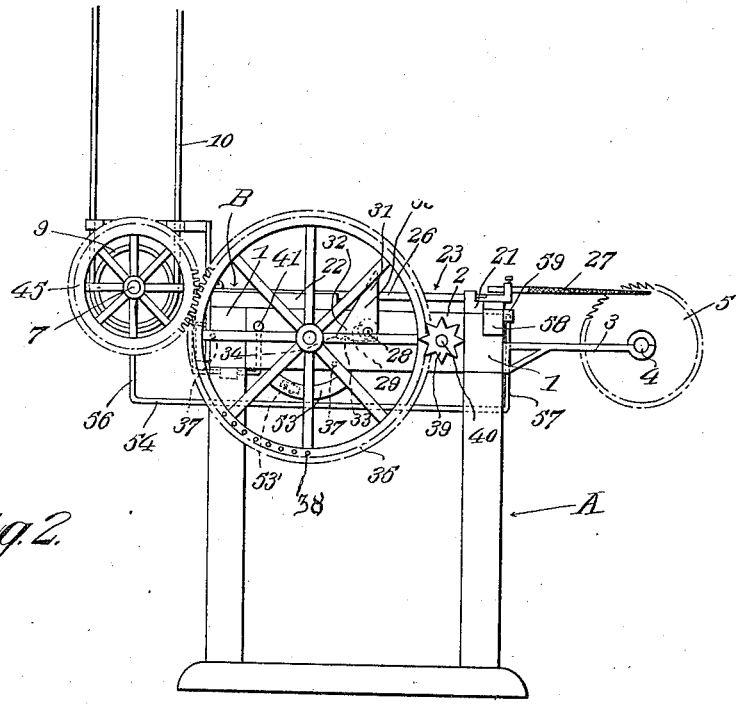

A. ROSS.
SAW FILING MACHINE.
APPLICATION FILED JAN. 13, 1912.
1,059,909.
Patented Apr. 22, 1913.
3 SHEETS—SHEET 3.
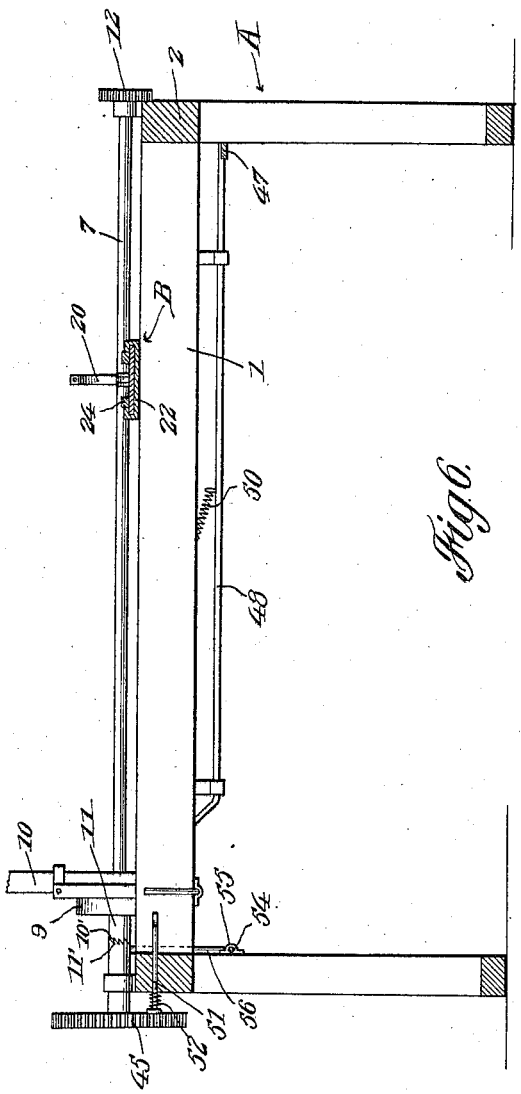
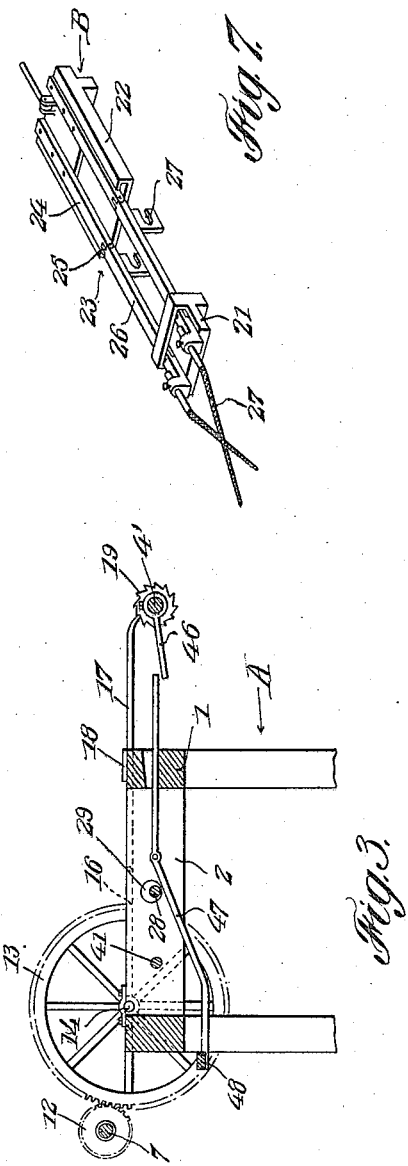
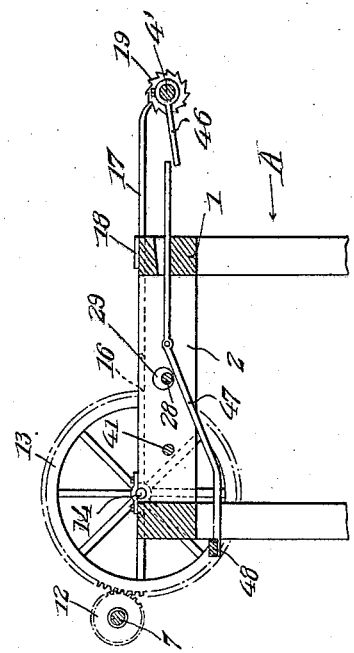
Witnesses
Inventor
Albert Ross,
By Victor J. Evans
Attorney

UNITED STATES PATENT OFFICE.

ALBERT ROSS, OF CARTHAGE, TEXAS.

SAW-FILING MACHINE.

1,059,909.  Specification of Letters Patent.  Patented Apr. 22, 1913.

Application filed January 13, 1912. Serial No. 670,979.

*To all whom it may concern:*

Be it known that I, ALBERT ROSS, a citizen of the United States of America, residing at Carthage, in the county of Panola and State of Texas, have invented new and useful Improvements in Saw-Filing Machines, of which the following is a specification.

The invention relates to improvements in saw filing machines, and more particularly to machines for sharpening gin and linter saws.

The primary object of the present invention is to provide a saw filing machine of this character which shall be entirely automatic in operation and upon receiving its initial start, will automatically file all the teeth of every saw, and upon the completion of the sharpening operation of one saw, will automatically move into engagement with the teeth of the next saw to be sharpened, continuing this operation until the sharpening operation of all the saws is completed.

Another object of the invention is to provide a saw sharpening machine, the sharpening or file-carrying mechanism of which shall be automatically lifted out of engagement with the teeth of one saw and moved into engagement with the teeth of the next saw, subsequent to which the sharpening mechanism is rendered immovable for travel from one saw to another and put into operation for the sharpening of the saw teeth.

To these ends the invention comprehends a support upon which the saws to be sharpened are held and a horizontally movable carriage or file-carrying mechanism, the file supporting arms of which are pivoted for swinging movement so that the same may be moved into and out of engagement with the teeth of the saws to be sharpened, the operating mechanism for the file carriage comprising, for this purpose, an automatically actuated shaft, upon one end of which is mounted a throw lever designed to be rendered operative and inoperative automatically by means of the driving mechanism of the machine, which latter is common to the mandrel, file carrying carriage and the mechanism for moving the carriage horizontally of the machine, as before stated.

With the above and other objects in view the invention consists in the construction, combination and arrangement of parts hereinafter set forth and falling within the scope of the appended claims, it being understood that such changes may be made as fairly fall within the scope of the claims, appended hereto, without departing from the spirit of the invention or sacrificing any advantages thereof.

In the accompanying drawings forming a portion of this specification; Figure 1 is a top plan view of a machine constructed in accordance with the present invention. Fig. 2 is an end elevation of the same. Fig. 3 is a transverse section on the line 3—3 of Fig. 1. Fig. 4 is a transverse section on the line 4—4 of Fig. 1. Fig. 5 is a transverse section on the line 5—5 of Fig. 1, parts being broken away to show the carriage operating mechanism. Fig. 6 is a longitudinal sectional view on the line 6—6 of Fig. 1. Fig. 7 is a detail perspective view of the file carriage, and Fig. 8 represents a detail of the machine.

Similar reference characters designate like parts throughout the drawings.

Referring more particularly to the accompanying drawings wherein I have illustrated the preferred form of my invention A designates the supporting frame of the machine including longitudinal and transverse bars 1 and 2 respectively, the former being provided with guide ways designed to facilitate the travel of the file carrying carriage B in the operation of the machine. Forwardly of the supporting frame A and connected thereto in any suitable manner are hangers 3 upon which the saw mandrel 4 is mounted and carries gin saws 5 to support the latter during the sharpening operation of the saws. Projecting rearwardly from the transverse bars 2 of the frame A and preferably formed integral therewith are bearings 6, 6 in which is mounted for rotary movement the main driving shaft 7.

Mounted upon the shaft 7 are fast and loose pulleys 8 and 9 respectively over which a belt is designed to travel to impart operative movement to the mechanism. The loose pulley 9 is preferably keyed to a clutch sleeve 11 loosely encircling the shaft 7 at one end of the latter and consisting of the male and female members 10' and 11' respectively, the sleeve being journaled in the bearing 6 adjacent this end of the driving shaft, the purpose of which will appear later. At its opposite end the shaft 7, exteriorly of the other bearing 6, has fixed thereto a pinion 12 designed to mesh with a gear 13 journaled upon a stub shaft 14 mounted in the transverse bar 2 and forwardly of the shaft 7. The gear 13 carries a crank pin 15 to which is pivotally connected one end of a lever 16, the opposite end of said lever being pivotally connected to a dog 17 slidably mounted in a bearing 18, arranged upon the bar 2, and adapted to engage a ratchet wheel 19 secured rigidly upon one end of a mandrel receiving shank 4' rotatably mounted in a bearing 5' extending forwardly of one of the transverse bars 2 and preferably formed integral therewith as shown, the opposite end of the mandrel receiving shank being formed with a socket 6' adapted to receive one end of the saw mandrel 4 for rotating the latter so that the said mandrel may receive its driving power from the main shaft 7 and be rotated in a step by step manner as will be readily understood. Although I have described this form of mechanism for driving the saw mandrel I desire it to be understood, and it will be readily obvious, that any other form of mechanism may be employed to obtain the desired end.

Adjacent the last named bearing 6, the shaft 7 is provided with an eccentric or other form of motion converting device 20 which is operatively connected with the rear end of the file carrying carriage B for imparting reciprocatory motion to the same so that the files may be operated to sharpen the saw teeth. The carriage B comprises front and rear plates 21 and 22 respectively adapted to travel in the guide ways of the longitudinal bars 1 of the frame A, and file carrying arms 23, each of which comprises an arm 24 having its rear end rigidly secured to the rear plate 22 of the carriage. The forward ends of the arms 24 are each pivotally connected at 25 to a file holder 26. Into these holders 26 the files 27 are secured and held in their operative position, the holders at the same time being permitted to slide freely within the forward plate 21. Adjacent their pivotal connections with the arms 24, the file holders 26 are provided with depending slotted lugs 27 for the purpose of receiving a lifting shaft 28.

The lifting shaft 28 is journaled in suitable bearings 29 supported by the transverse bars 2 of the frame A. The bearings 29 are provided with eccentrics suitably fastened to the opposite ends of the shaft 28. The shaft 28, preferably exteriorly of one of the transverse bars 2, has fixed thereto what I term a throw lever 30 having a long arm 31 and a short arm 32, the latter being at an angle to the arm 31 and is provided with a depression 33, the depression providing a shoulder 34 the purpose of which will hereinafter appear.

The numeral 35 designates a gear wheel journaled upon a stubshaft carried by the side bar 2 and arranged rearwardly of and adjacent the point of connection of the throw lever 30 and the shaft 28. This gear wheel 35 is provided upon its inner side with lugs 37, one of the lugs being arranged near the center of the wheel and the other adjacent the periphery thereof for the purpose of alternately engaging the ends of the lever 30 so as to rock the same and consequently the shaft 28 in its bearings, the eccentricity of the bearings permitting the shaft to be raised and lowered and impart a similar motion to the file holders 26 through the medium of the depending slotted lugs 27 so as to bring the files into and out of engagement with the saws. On its outer surface and adjacent its peripheral edge the gear wheel 35 is provided with a series of pins 38 which are suitably mounted at equal distances apart upon a portion of the circumference of the wheel, and are designed to engage a sprocket or star wheel 39 arranged upon one end of a short shaft 40 journaled in one side bar 2 of the frame and parallel with the shaft 40 is a screw shaft 41 provided, adjacent one end, with a sprocket 42 designed to receive an endless operating chain 43 which latter is driven by a sprocket 44 keyed to the shaft 40 and in alinement with the sprocket 42 of the shaft 41. The arms 24 of the carriage B are preferably provided with a split nut adapted to freely engage the shaft 41 so that in the movement of the shaft 41, as will be hereinafter described, the carriage B may be moved longitudinally of the frame of the machine so as to bring the files into alinement with the saws in the sharpening operation. Keyed upon the free end of the female member 11' of the sleeve 11 is a pinion 45 designed to mesh with the gear wheel 35 and receiving its motion from the pulley 9 carried by the opposite end of the sleeve.

For the purpose of shifting the belt 10 from the pulley 8 to the pulley 9 a suitable shift mechanism is provided and operated at the completion of each and every revolution of the mandrel 4. This mechanism preferably comprises a trip 46 keyed to the mandrel receiving shank 4' and adapted to engage one end of a release lever 47 which latter is pivotally mounted upon one of the side bars 2 of the machine. The opposite or free end of the release lever 47 is designed to engage a cut out portion of a belt shifter rod 48 slidably mounted in suitable bearings 49 carried by one of the longitudinal bars 1. This grooved or cut out portion of the rod 48 forms a latch and is normally engaged by the release lever 47 to hold the shifter rod against the tension of the retractile spring 50, one end of which is fastened to the rod 48 and the opposite end to the longitudinal bar 1 as clearly illustrated in Fig. 1 of the drawings. In this position of the rod 48 the belt 10 is held upon the fast pulley 8 thereby permitting the driving of the shaft 7 to reciprocate the file carriage B and rotate the saw mandrel 4. When the mandrel 4 has completed one revolution the trip 46 operates the release lever 47 and causes the same to disengage the rod 48, at which time the spring 50 actuates the belt shifter rod to carry the belt from the pulley 8 to the pulley 9, the latter operation permitting the pinion 45 to be driven through the medium of the sleeve 11 and consequently the gear 35. In the movement of the gear wheel 35 the inner one of the lugs 37 engages the short arm 32 of the throw lever 30 and riding into the depression 33 engages the shoulder 34 thereof and rocks the shaft 28 to raise the file holders thus lifting the files from the saws. Immediately succeeding this operation the pins 38 of the gear wheel 35 engage the star wheel 39 and rotate the shaft 40, the latter transmitting its motion through the chain 43 and sprockets 42 and 44 and the screw shaft 41, the latter operating the carriage to move the files to the next saw to be sharpened. The operation of the screw shaft 41 will be checked at this point due to the pins 38 being arranged only upon a portion of the circumference of the gear wheel 35. Subsequent to the above movement of the carriage the long arm 31 of the throw lever 30 is engaged by the outer lug on the gear 35, thereby operating the shaft 28 to bring the files into engagement with the teeth of the saws.

For the purpose of returning the belt 10 to the fast pulley 8 so that the reciprocatory movement of the files and the rotary movement of the mandrel 4 may be renewed, I provide a suitable mechanism for returning the belt shifter rod 48 to its position. This mechanism comprises a plunger 51 slidably mounted in one of the cross bars 2 of the supporting frame A and normally held in retracted position by means of a retractile spring 52 which latter encircles the plunger rod intermediate the cross bar 2 and the head of the plunger. The gear wheel 35 has arranged upon its inner surface a cam or inclined track section 53, designed to engage the free terminal of the plunger rod to operate the plunger against the action of the spring 52 to engage the belt shifter rod 48 and return the same to its normal position so that the sharpening operation of the machine may be continued. The plunger is operated as above described simultaneously with the return of the file holders for engagement with the saw teeth, immediately after which action the machine is put into operation as above described for sharpening purposes.

To prevent accidental movement of the gear wheel 35 after the files have been returned to the saws for sharpening purposes, or to prevent premature operation of the gear wheel, the inner end of the plunger 51 is designed to engage a yieldable dog 53' arranged upon the inner surface of the gear wheel 35 at a point adjacent the cam or inclined track section 53, thus preventing further movement of the gear wheel 35 following the shifting of the belt from the pulley 9 to the pulley 8, the yieldable end of the dog 53' serving to permit movement of the gear wheel 35 under the action of the pinion 45 in the shifting of the carriage.

To insure the safety of the machine in the absence of the operator and to facilitate the operation of stopping and starting the machine at the will of the operator without shutting off the power, as in the event of changing files or for other purposes, the machine is equipped with a safety stop by which connection between the male and female members of the clutch lever 11 may be severed, permitting the loose pulley to idle. This mechanism embodies a latch or releasing device which is operable by the carriage, upon the same reaching its limit of movement relatively to the machine in either direction, to separate the clutch members to render the loose pulley inoperative. More specifically this mechanism consists of a substantially U-shaped lever 54 pivoted to the machine frame as at 55 and having one arm 56 thereof rigidly secured to the female member 11" of the clutch sleeve. The opposite arm 57 of this U-shaped lever is designed to be engaged by a spring latch 58 fixed to the machine frame and provided with a stop lug 59. The latch 58 projects inwardly of the frame and is operatively engaged on its under surface by a lever 59' pivoted to the rear longitudinal bar 1 of the machine frame. The lower end of the lever 59' is pivotally connected to one end of an actuating rod 60, the free end of which terminates in an upstanding projection 61 arranged at the opposite end of the machine, the lever and the upstanding projection 61 being positioned in the path of movement of the carriage and at the limit thereof. The arm 57 has connected thereto one end of a retractile spring 62, the opposite end of which is secured to one of the standards of the machine frame A. The rear plate 22 of the carriage is provided with oppositely disposed lateral projections 63 and 64 designed to engage the lever 59 and the upstanding projection 61 respectively, in the movement of the carriage. From this construction it will be seen that upon the carriage reaching its limit of movement in either direction, the projections 63 and 64 will engage the members 59 and 61 to raise the latch 58 thereby releasing the arm 57 of the U-shaped lever 54 from engagement with the stop lug 59, the upstanding projection 61 at the same time serving as an operating handle whereby the file carriage may be stopped in its movement to facilitate the changing of the files or for other purposes. Upon the release of the arm 57 the spring 62 operates to disengage the clutch members through the medium of the lever 54, which latter rocks upon its pivot 55.

From the above description taken in connection with the drawings it will be seen that I have provided a machine which is entirely automatic in its action and in which the saw support remains stationary, thereby doing away with the complicated mechanism necessary to move the saw mandrel to permit the sliding movement of the carriage. It will further be seen that my invention embodies a simple and compact mechanism to which access can be readily had for the purpose of cleaning and repairing upon the same being necessary.

Having thus described my invention what I claim and desire to secure by Letters-Patent, is:

1. A saw filing machine comprising a frame, means for supporting a saw carrying mandrel having a plurality of saws thereon, means for rotating the mandrel, a carriage mounted on the frame, a filing mechanism on the carriage, an operating mechanism common to the mandrel, carriage and filing mechanism, and connections between the operating mechanism and the mandrel, carriage and saw filing mechanism, arranged to automatically operate upon the completion of each rotative movement of the mandrel to lift the filing mechanism out of engagement with the saws, to then shift the carriage to bring the filing mechanism into alinement with the adjacent saw and then return the filing mechanism to engage the next saw to be sharpened.

2. A saw filing machine comprising a frame, means for supporting a saw carrying mandrel having a plurality of saws thereon, a carriage mounted on the frame and longitudinally slidable thereof, a filing mechanism on the carriage, driving means common to the mandrel and saw filing mechanism and rotating and reciprocating the same respectively, means for sliding the carriage longitudinally of the frame, and means operable from said first-named means to lift the filing mechanism out of engagement with the saws previous to the sliding movement of the carriage.

3. A saw filing machine comprising a frame, means for supporting a saw carrying mandrel having a plurality of saws thereon, a carriage mounted on the frame and longitudinally slidable thereof, a filing mechanism mounted on the carriage, means common to the mandrel and filing mechanism for rotating and reciprocating the same respectively, means for sliding the carriage longitudinally of the frame, and a lifting shaft mounted eccentrically on the frame for lifting the filing mechanism out of engagement with the saws previous to the longitudinal movement of the carriage.

4. A saw filing machine comprising a frame, means for supporting a saw carrying mandrel having a plurality of saws thereon, a carriage mounted on the frame and slidable longitudinally thereon, a filing mechanism on the carriage, a shaft common to the mandrel and filing mechanism for rotating and reciprocating the same respectively, means for sliding the carriage longitudinally of the frame, a lifting bar mounted eccentrically on the frame and engaging the filing mechanism to lift the same out of engagement with the saws, a throw lever pivotally connected to said lifting shaft, and means for operating the throw lever.

5. A saw filing machine comprising a frame, means for supporting a saw carrying mandrel having a plurality of saws thereon, a carriage mounted on the frame and slidable longitudinally thereon, a filing mechanism on the carriage, a main driving shaft common to the mandrel and filing mechanism for rotating and reciprocating the same respectively, means for sliding the carriage longitudinally of the frame, a lifting bar mounted eccentrically on the frame, and engaging the filing mechanism to lift the same out of engagement with the saws, a throw lever pivotally connected to said lifting shaft, means for operating the throw lever, and a connection between said last-named means and the main driving shaft.

6. A saw filing machine comprising a frame, means for supporting a saw carrying mandrel having a plurality of saws thereon, a carriage mounted on the frame and longitudinally slidable thereon, a filing mechanism on the carriage, an operating mechanism common to the mandrel and filing mechanism for rotating and reciprocating the same respectively, means connected to said operating mechanism for moving the carriage longitudinally of the frame, and means brought alternately into and out of engagement with said operating mechanism to lift the filing mechanism out of engagement with the saws previous to the longitudinal movement of the carriage.

7. A saw filing machine comprising a frame, means for supporting a saw carrying mandrel having a plurality of saws thereon, a carriage mounted on the frame and longitudinally slidable thereon, a filing mechanism on the carriage, an operating mechanism common to the mandrel and filing mechanism for rotating and reciprocating the same respectively, means connected to said operating mechanism for moving the carriage longitudinally of the frame, and means brought alternately into and out of engagement with said operating mechanism to lift the filing mechanism out of engagement with the saws previous to the longitudinal movement of the carriage, said last-named mechanism including a lifting shaft mounted eccentrically on the frame and in engagement with the filing mechanism, a throw lever connected to said shaft and means for operating the throw lever.

8. A saw filing machine comprising a frame, means for supporting a saw carrying mandrel having a plurality of saws thereon, a carriage mounted on the frame and longitudinally slidable thereon, a filing mechanism on the carriage, an operating mechanism common to the mandrel and filing mechanism for rotating and reciprocating the same respectively, means connected to said operating mechanism for moving the carriage longitudinally of the frame, and means brought alternately into and out of engagement with said operating mechanism to lift the filing mechanism out of engagement with the saws previous to the longitudinal movement of the carriage, said last-named mechanism including a lifting shaft mounted eccentrically on the frame and in engagement with the filing mechanism, a throw lever connected to said shaft, means for operating the throw lever, a gear wheel provided with a plurality of lugs adapted to be brought into engagement with said throw lever to raise and lower the lifting shaft for the purpose described.

9. A saw filing machine comprising a frame, means for supporting a saw carrying mandrel having a plurality of saws thereon, a carriage mounted on the frame and longitudinally slidable thereon, a filing mechanism on the carriage, a driving mechanism common to the mandrel and saw filing mechanism for rotating and reciprocating the same respectively, means for lifting the saw filing mechanism into and out of engagement with the saws, means connected to said last-named means for sliding the carriage longitudinally of the frame subsequent to the lifting action, and means for shifting the power from said first-named mechanism to the carriage lifting mechanism, said last-named means being operated by the saw mandrel upon the completion of a revolution of the same, to shift said mechanism.

10. A saw filing machine comprising a frame, means for supporting a saw carrying mandrel having a plurality of saws thereon, a carriage mounted on the frame and slidable longitudinally thereon, a filing mechanism on the carriage, an operating mechanism common to the mandrel and saw filing mechanism to rotate and reciprocate the same respectively, means operable from said operating mechanism to move the carriage longitudinally of the frame, means connected to said last-named means for lifting the filing mechanism out of engagement with the saws previous to the sliding of the carriage, means for stopping the motion of said operating mechanism previous to the sliding of the carriage and the lifting of the filing mechanism from the saws, said last-named means including a power shifting device adapted to be operated by the saw mandrel to check the rotary movement of the mandrel and the reciprocatory movement of the filing mechanism before the carriage and filing mechanism are rendered inoperative for sharpening purposes, and means for returning the power shifting device to its normal position upon the carriage and saw filing mechanism being rendered operative for sharpening purposes.

11. A saw filing machine comprising a frame, means stationary relative to the frame for supporting a saw carrying mandrel having a plurality of saws thereon, means for rotating the mandrel, a carriage mounted on the frame, a filing mechanism on the carriage, an operating mechanism common to the mandrel, carriage and filing mechanism, and connections between the operating mechanism and mandrel, carriage and saw filing mechanism, arranged to automatically operate upon the completion of each rotary movement of the mandrel to move the filing mechanism out of engagement with the saws, to then shift the carriage to bring the filing mechanism into alinement with the adjacent saw and then return the filing mechanism to engage the next saw to be sharpened, and means operable automatically upon the completion of the sharpening operation of the saws to stop the operation of the machine.

12. A saw filing machine comprising a frame, means stationary relative to the frame for supporting a saw carrying mandrel having a plurality of saws thereon, means for rotating the mandrel, a carriage mounted on the frame, a filing mechanism on the carriage, an operating mechanism common to the mandrel, carriage and filing mechanism, and connections between the operating mechanism and mandrel, carriage and saw filing mechanism, arranged to automatically operate upon the completion of each rotary movement of the mandrel to move the filing mechanism out of engagement with the saws, to then shift the carriage bring the filing mechanism into alinement with the adjacent saw and then return the filing mechanism to engage the next saw to be sharpened, and means operable automatically upon the completion of the sharpening operation of the saws to stop the operation of the machine independently of the driving power of the machine.

13. A saw filing machine comprising a frame, means for supporting a plurality of saws, a filing mechanism mounted on the frame and slidable longitudinally thereof, means for rotating the saws and operating the filing mechanism, and means operable to lift the filing mechanism out of engagement with the saws upon the completion of the sharpening of a saw.

14. A saw filing machine comprising a frame, means supporting a saw carrying mandrel having a plurality of saws thereon, a filing mechanism mounted on the frame and slidable longitudinally thereof and adapted for engagement with the saws, means for moving the filing mechanism longitudinally of the frame to sharpen the individual saws, means for lifting the filing mechanism out of engagement with the saws previous to the sliding of such mechanism on the frame, and means for stopping the motion of the last-named means previous to the sliding of the filing mechanism on the frame whereby the filing mechanism may be moved longitudinally of the frame in its lifted or elevated position.

15. A saw filing machine comprising a frame, means for supporting a plurality of saws, a filing mechanism on the frame and slidable longitudinally thereof, means for rotating the saws, means for operating the filing mechanism to sharpen the saws successively, and means operable to lift the filing mechanism out of engagement with the saws upon the completion of the sharpening of each saw, said means comprising a shaft, bearings mounted eccentrically on the frame and receiving said shaft, and means for actuating the shaft and its bearings to elevate the filing mechanism.

16. A saw filing machine comprising a frame, means for supporting a plurality of saws, a filing mechanism on the frame and slidable longitudinally thereof, means for rotating the saws, means for operating the filing mechanism to sharpen the saws successively, and means operable to lift the filing mechanism out of engagement with the saws upon the completion of the sharpening of each saw, said means comprising a shaft, bearings mounted eccentrically on the frame and fixed to said shaft, a throw lever fixed to the shaft, and means for operating said throw lever to actuate the shaft and its bearings to elevate the filing mechanism.

In testimony whereof I affix my signature in presence of two witnesses.

ALBERT ROSS.

Witnesses:
A. ESCOE,
W. T. ALSTON.

---

Copies of this patent may be obtained for five cents each, by addressing the "Commissioner of Patents, Washington, D. C."